United States Patent

Linsky et al.

[11] Patent Number: 5,886,072
[45] Date of Patent: Mar. 23, 1999

[54] FLAME RETARDANT COMPOSITION

[75] Inventors: Leonard A. Linsky, Providence; John C. Andries, Greenwich, both of R.I.; Donald Ouellette, South Attleboro, Mass.; John A. Buono, Riverside, R.I.; Tao Tao, North Attleboro, Mass.

[73] Assignee: Teknor Apex Company, Pawtucket, R.I.

[21] Appl. No.: 511,967

[22] Filed: Aug. 7, 1995

Related U.S. Application Data

[63] Continuation-in-part of Ser. No. 66,965, May 24, 1993, abandoned.

[51] Int. Cl.$^6$ ............... C08K 3/20; C08K 3/38; C08K 5/103; C08K 5/521
[52] U.S. Cl. .................. 524/145; 524/296; 524/295; 524/405; 524/315
[58] Field of Search .................. 524/288, 292, 524/294, 295, 296, 297, 136, 145, 147, 311, 312, 313, 314, 315, 316, 317, 318, 405

[56] References Cited

U.S. PATENT DOCUMENTS

| 4,500,748 | 2/1985 | Klein | 174/121 A |
| 4,670,494 | 6/1987 | Semenza | 524/141 |
| 4,892,683 | 1/1990 | Naseem | 252/609 |
| 5,036,121 | 7/1991 | Coaker et al. | 524/100 |
| 5,227,417 | 7/1993 | Kroushi, III | 524/114 |
| 5,302,650 | 4/1994 | Ito | 524/298 |
| 5,430,108 | 7/1995 | Schlosberg et al. | 524/311 |

*Primary Examiner*—Joseph D. Anthony
*Attorney, Agent, or Firm*—Fish & Richardson P.C.

[57] ABSTRACT

Flame retardant compositions for cable jacketing and wire insulation that contain:

(a) polyvinyl chloride resin;
(b) a pentaerythritol ester plasticizer;
(c) aluminum trihydrate;
(d) antimony trioxide flame retardant;
(e) a brominated phthalate ester;
(f) isodecyl diphenyl phosphate plasticizer; and
(g) zinc borate flame retardant and that are free of chlorinated polyvinyl chloride resin are disclosed.

12 Claims, No Drawings

FLAME RETARDANT COMPOSITION

CROSS REFERENCE TO RELATED APPLICATIONS

This application is a continuation-in-part of Linsky et al., U.S. application Ser. No. 08/066,965 filed May 24, 1993 entitled "Flame Retardant Composition, now abandoned."

BACKGROUND OF THE INVENTION

This invention relates to flame retardant compositions for cable jacketing and wire insulation based upon polyvinyl chloride.

A variety of flame retardant compositions for cable jacketing and wire insulation based upon polyvinyl chloride are known. These compositions typically contain, in addition to polyvinyl chloride, one or more flame retardants, plasticizers, lubricants, and/or fillers. It is desirable for these compositions to exhibit low smoke generation and low flame travel.

SUMMARY OF THE INVENTION

In a first aspect, the invention features a flame retardant composition for cable jacketing and wire insulation exhibiting improved low temperature properties. This composition includes (in amounts based upon 100 parts of polyvinyl chloride):

(a) 100 parts polyvinyl chloride resin;
(b) about 10–50 parts of an ester plasticizer that is the reaction product of a polyol consisting essentially of pentaerythritol and a mixture of fatty acids having an average carbon number of about 6.7;
(c) about 50–80 parts of aluminum trihydrate;
(d) about 1–10 parts of antimony trioxide flame retardant;
(e) no greater than 15 parts of a brominated phthalate ester;
(f) about 2–20 parts of isodecyl diphenyl phosphate plasticizer; and
(g) about 1–5 parts of zinc borate flame retardant. The composition is free of chlorinated polyvinyl chloride resin. The composition may also contain about 4–15 parts of ammonium octamolybdate flame retardant, about 0.1–0.5 parts of a lubricant (e.g., stearic acid), about 3–10 parts of a basic lead heat stabilizer, and about 5–30 parts of a filler (e.g., calcined clay and/or calcium carbonate). Another example of a flame retardant that may be included in the composition is a zinc-molybdenum complex (preferably in an amount ranging from about 5–15 parts). The amount of brominated phthalate ester preferably is about 10–15 parts.

One example of a preferred plasticizer is the reaction product of pentaerythritol and a fatty acid mixture consisting essentially of valeric, caproic, enanthic, caprylic, and pelargonic acids in which the relative amounts of the respective acids is selected to yield an average carbon number of about 6.7.

In a second aspect, the invention features a flame retardant composition for cable jacketing and wire insulation that includes (in amounts based upon 100 parts of polyvinyl chloride):

(a) 100 parts polyvinyl chloride resin;
(b) about 10–50 parts of an ester plasticizer (e.g., a pentaerythritol ester plasticizer);
(c) about 25–80 parts of aluminum trihydrate;
(d) about 1–10 parts of antimony trioxide flame retardant;
(e) less than 15 parts of a brominated phthalate ester;
(f) about 2–20 parts of isodecyl diphenyl phosphate plasticizer;
(g) about 4–15 parts of ammonium octamolybdate flame retardant; and
(h) about 1–5 parts of zinc borate flame retardant.

The composition is free of chlorinated polyvinyl chloride resin. The composition may also contain about 0.1 to 0.5 parts of a lubricant (e.g., stearic acid), about 3–10 parts of a basic lead stabilizer (e.g., dibasic and/or tribasic lead stabilizer), and about 5–30 parts of a filler (e.g., calcined clay). The amount of brominated phthalate ester is preferably about 2–10 parts (e.g., about 10 parts). The amount of aluminum trihydrate preferably is greater than 50 parts (e.g., about 70 parts).

The invention provides flame retardant compositions useful for cable jacketing and wire insulation (particularly 1–100 pair) exhibiting low smoke generation and low flame travel. In the case of compositions containing a plasticizer that is the reaction product of pentaerythritol and a mixture of fatty acids having an average carbon number of about 6.7, the composition exhibits good low temperature properties (as exemplified by a relatively low brittle point).

Other features and advantages of the invention will be apparent from the following description of the preferred embodiments thereof, and from the claims.

DESCRIPTION OF THE PREFERRED EMBODIMENTS

Flame retardant compositions according to the invention have the general formulae given in the Summary of the Invention, above. The compositions are prepared according to conventional methods by combining all of the ingredients in a high speed mixer (e.g., a Banbury mixer, extruder, or multiple screw extruder). One preferred composition contains the following ingredients (based upon 100 parts of polyvinyl chloride resin):

| Composition No. 1 | |
| --- | --- |
| Ingredient | Amount |
| Polyvinyl chloride resin | 100 |
| Pentaerythritol ester plasticizer[1] | 33 |
| Calcined clay[2] | 5 |
| Aluminum trihydrate[3] | 70 |
| Basic lead heat stabilizer[4] | 6 |
| Stearic acid lubricant[5] | 0.25 |
| Antimony trioxide flame retardant[6] | 5 |
| Brominated phthalate ester[7] | 10 |
| Isodecyl diphenyl phosphate[8] | 5 |
| Ammonium octamolybdate flame retardant[9] | 10 |
| Zinc borate flame retardant[10] | 2 |

[1] Hercoflex 707A, commercially available from Hercules.
[2] SP33 clay, a wire and cable electrical grade calcined aluminum silicate clay filler commercially available from Englehard Corp.
[3] Alcoa C710B, commercially available from Alcoa.
[4] Lectro 90 TA, commercially available from Synpron.
[5] Hystrene, commercially available from Witco.
[6] Fireshield LS-FR, commercially available from Laurel Industries.
[7] Great Lakes DP-45, commercially available from Great Lakes Chemical.
[8] Santicizer 2148, commercially available from Monsanto.
[9] Climax AOM, commercially available from Amax.
[10] Climax ZB467, commercially available from Amax.

This composition exhibited the following physical properties (as tested according to the designated ASTM procedure):

Specific gravity (±0.02): 1.61 (ASTM D-792)
Hardness (Shore C±3) (10 sec): 82 (ASTM D-2240)

Tensile strength (lbs/in$^2$): 2515 (ASTM D-412)
100% Modulus 2120 (ASTM D-412)
Elongation %: 225 (ASTM D-412)
Brittle point (model E, °C.): 0 (ASTM D-746)
Oxygen Index: 49 (ASTM D-2863)
Arapahoe Smoke, decharred: 1.8% (ASTM D-4100)
  not decharred: 3.7% (ASTM D-4100)

Cable constructions prepared using the composition as cable jacketing and wire insulation also passed the UL 910 Steiner Tunnel test, exhibiting lower smoke generation than compositions having higher amounts of brominated phthalate plasticizer (greater than 15 parts per hundred parts polyvinyl chloride resin) and lower amounts of aluminum trihydrate (less than 50 parts per hundred parts polyvinyl chloride resin).

A second preferred composition has the following composition:

Composition No. 2

| Ingredient | Amount |
| --- | --- |
| Polyvinyl chloride resin | 100 |
| Pentaerythritol ester plasticizer | 30 |
| Calcined clay | 5 |
| Aluminum trihydrate | 50 |
| Basic lead heat stabilizer | 6 |
| Stearic acid lubricant | 0.20 |
| Antimony trioxide flame retardant | 2 |
| Brominated phthalate ester | 15 |
| Isodecyl diphenyl phosphate | 5 |
| Ammonium octamolybdate flame retardant | 10 |
| Zinc borate flame retardant | 2 |

In this composition, the same commercially available ingredients set forth in the first composition are used, with the exception of the pentaerythritol ester plasticizer. In the first composition, the pentaerythritol plasticizer was Hercules 707A, an ester that is the reaction product of a mixture of pentaerythritol plus di-pentaerythritol polyols and a fatty acid mixture. In the second composition, however, the ester plasticizer is an ester that is the reaction product of pentaerythritol alone and a fatty acid mixture having an average carbon number of about 6.7 (± about 0.2) that consists of valeric acid (less than about 1.0%), caproic acid (about 35.0%), enanthic acid (50.0%), caprylic acid (less than about 11.6%), and pelargonic acid (less than about 1.0%), where all amounts are given in weight percent. The advantage of using this particular ester plasticizer is that the resulting composition has improved low temperature properties, as manifested in a lower brittle point value. The properties of Composition No. 2 are as follows:
Specific gravity (±0.02): 1.56 (ASTM D-792)
Hardness (Shore C±3) (10 sec): 88 (ASTM D-2240)
Tensile strength (lbs/in$^2$): 2880 (ASTM D-412)
Elongation %: 210 (ASTM D-412)
Brittle point (model E, °C.): -18 (ASTM D-746)
Oxygen Index: 39.5 (ASTM D-2863)

Cable constructions prepared using the composition as cable jacketing and wire insulation also passed the UL 910 Steiner Tunnel test.

A third composition, also based upon the ester plasticizer used in the second composition, is as follows:

Composition No. 3

| Ingredient | Amount |
| --- | --- |
| Polyvinyl chloride resin | 100 |
| Pentaerythritol ester plasticizer | 31 |
| Calcined clay | 5.4 |
| Aluminum trihydrate | 75 |
| Basic lead heat stabilizer | 5.9 |
| Stearic acid lubricant | 0.27 |
| Antimony trioxide flame retardant | 5.4 |
| Brominated phthalate ester | 10.7 |
| Isodecyl diphenyl phosphate | 5.4 |
| Zinc borate flame retardant | 2.1 |

The identity of the ingredients is the same as in Composition No. 2. Composition No. 3 exhibited the following physical properties:
Specific gravity (±0.02): 1.61 (ASTM D-792)
Hardness (Shore C±3) (10 sec): 87 (ASTM D-2240)
Brittle point (model E, °C.): -12 (ASTM D-746)
Oxygen Index: 48 (ASTM D-2863)

Cable constructions prepared using the composition as cable jacketing and wire insulation also passed the UL 910 Steiner Tunnel test.

A fourth preferred composition is as follows:

Composition No. 4

| Ingredient | Amount |
| --- | --- |
| Polyvinyl chloride resin | 100 |
| Pentaerythritol ester plasticizer | 31 |
| Calcium carbonate | 10 |
| Calcined clay | 5 |
| Aluminum trihydrate | 60 |
| Basic lead heat stabilizer | 7 |
| Stearic acid lubricant | 0.25 |
| Antimony trioxide flame retardant | 5 |
| Brominated phthalate ester | 10 |
| Isodecyl diphenyl phosphate | 5 |
| Zinc-molybdenum complex flame retardant | 10 |
| Zinc borate flame retardant | 2 |

The identity of the ingredients is the same as in Composition No. 2 except that instead of an ammonium octamolybdate flame retardant, a zinc-molybdenum flame retardant is used. An example of a suitable commercially available zinc-molybdenum complex for this purpose is Charmax LSZ4A from Polymer Additives Group. In addition, a second filler (calcium carbonate, commercially available under the designation "Atomite" from Omya) is included. Composition No. 4 had the following physical properties:
Specific gravity (±0.02): 1.61 (ASTM D-792)
Hardness (Shore C±3) (10 sec): 89 (ASTM D-2240)
Tensile strength (lbs/in$^2$): 3050 (ASTM D-412)
Elongation %: 170 (ASTM D-412)
Brittle point (model E, °C.): -10 (ASTM D-746)
Oxygen Index: 46 (ASTM D-2863)

Cable constructions prepared using the composition as cable jacketing and wire insulation also passed the UL 910 Steiner Tunnel test.

Other embodiments are within the following claims.

What is claimed is:

1. A flame retardant composition for cable jacketing and wire insulation comprising (in amounts based upon 100, by weight, parts of polyvinyl chloride):
    (a) 100 parts polyvinyl chloride resin;
    (b) about 10–50 parts of an ester plasticizer that is the reaction product of a polyol consisting essentially of pentaerythritol and a mixture of fatty acids having an average carbon number of about 6.7;

(c) about 50–80 parts of aluminum trihydrate;

(d) about 1–10 parts of antimony trioxide flame retardant;

(e) no greater than 15 parts of a brominated phthalate ester;

(f) about 2–20 parts of isodecyl diphenyl phosphate plasticizer; and (g) about 1–5 parts of zinc borate flame retardant,
said composition being free of chlorinated polyvinyl chloride resin.

2. The flame retardant composition of claim 1 further comprising 4–15 parts of ammonium octamolybdate flame retardant.

3. The flame retardant composition of claim 1 further comprising 5–15 parts of a flame retardant comprising a zinc-molybdenum complex.

4. The flame retardant composition of claim 1 wherein the amount of said brominated phthalate ester is 10–15 parts.

5. The flame retardant composition of claim 1 further comprising about 3–10 parts of a basic lead heat stabilizer.

6. The flame retardant composition of claim 1 wherein said ester plasticizer is the reaction product of a polyol consisting essentially of pentaerythritol and a mixture of fatty acids, wherein said fatty acids are selected from the group consisting of valeric, caproic, enanthic, caprylic, and pelargonic acids, in which the relative amounts of said acids are selected to yield an average carbon number of about 6.7.

7. The flame retardant composition of claim 1 further comprising about 0.1–0.5 parts of a lubricant.

8. The flame retardant composition of claim 7 wherein said lubricant comprises stearic acid.

9. The flame retardant composition of claim 1 further comprising about 5–30 parts of a filler.

10. The flame retardant composition of claim 9 wherein said filler comprises calcined clay.

11. The flame retardant composition of claim 9 wherein said filler comprises calcium carbonate.

12. A flame retardant composition for cable jacketing and wire insulation comprising (in amounts based upon 100 parts, by weight, of polyvinyl chloride):

(a) 100 parts polyvinyl chloride resin;

(b) about 10–50 parts of an ester plasticizer that is the reaction product of a polyol consisting essentially of pentaerythritol and a mixture of fatty acids having an average carbon number of about 6.7, wherein said fatty acids are selected from the group consisting of valeric, caproic, enanthic, caprylic, pelargonic, and caproic acids;

(c) about 50–80 parts of aluminum trihydrate;

(d) about 1–10 parts of antimony trioxide flame retardant;

(e) about 1–15 parts of a brominated phthalate ester;

(f) about 2–20 parts of isodecyl diphenyl phosphate plasticizer;

(g) about 1–5 parts of zinc borate flame retardant;

(h) about 5–30 parts of a filler;

(i) about 3–10 parts of a basic lead heat stabilizer; and (j) about 0.1–0.5 parts of a stearic acid lubricant,
said composition being free of chlorinated polyvinyl chloride resin.

* * * * *